United States Patent
Seo et al.

(10) Patent No.: US 10,254,882 B2
(45) Date of Patent: Apr. 9, 2019

(54) TOUCH SENSOR, DISPLAY APPARATUS INCLUDING TOUCH SENSOR, AND METHOD OF DRIVING DISPLAY APPARATUS INCLUDING TOUCH SENSOR

(71) Applicant: Samsung Display Co., Ltd., Yongin-si (KR)

(72) Inventors: Su Jin Seo, Yongin-si (KR); Ha Neul Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 241 days.

(21) Appl. No.: 15/226,880

(22) Filed: Aug. 2, 2016

(65) Prior Publication Data

US 2017/0115803 A1 Apr. 27, 2017

(30) Foreign Application Priority Data

Oct. 22, 2015 (KR) ........................ 10-2015-0147297

(51) Int. Cl.
  *G06F 3/041* (2006.01)
  *G09G 3/3208* (2016.01)
  *G06F 3/044* (2006.01)

(52) U.S. Cl.
  CPC .......... *G06F 3/0416* (2013.01); *G06F 3/0412* (2013.01); *G09G 3/3208* (2013.01); *G06F 3/044* (2013.01); *G09G 2320/0295* (2013.01)

(58) Field of Classification Search
  CPC ...... G06F 3/0412; G06F 3/0416; G06F 3/044; G09G 2320/0295; G09G 3/3208
  See application file for complete search history.

(56) References Cited

U.S. PATENT DOCUMENTS

| | | | |
|---|---|---|---|
| 2012/0154323 A1* | 6/2012 | Nambu ................ | G06F 3/0416 345/174 |
| 2013/0106779 A1 | 5/2013 | Company Bosch et al. | |
| 2014/0021966 A1* | 1/2014 | Shahrokhi .......... | G01R 27/2605 324/679 |
| 2014/0160086 A1 | 6/2014 | Lee et al. | |

(Continued)

FOREIGN PATENT DOCUMENTS

| | | |
|---|---|---|
| JP | 2015-087895 | 5/2015 |
| KR | 10-2012-0063772 | 6/2012 |

(Continued)

*Primary Examiner* — Dmitriy Bolotin
(74) *Attorney, Agent, or Firm* — H.C. Park & Associates, PLC (57) ABSTRACT

A touch sensor includes sensing electrodes and a touch controller. The sensing electrodes are electrically separated from each other, the sensing electrodes including a first sensing electrode and a second sensing electrode. The touch controller is configured to provide driving signals to the sensing electrodes, to receive sensing signals from the sensing electrodes, and to determine a touch position based on the sensing signals. The touch controller is further configured to, in response to reception of a frequency increase signal including information about the first sensing electrode, set a frequency of a driving signal provided to the first sensing electrode as a first frequency, and to set a frequency of a driving signal provided to the second sensing electrode as a second frequency different than the first frequency.

20 Claims, 9 Drawing Sheets

(56) References Cited

U.S. PATENT DOCUMENTS

| | | | |
|---|---|---|---|
| 2014/0375570 A1* | 12/2014 | Cok | G06F 3/0416 |
| | | | 345/173 |
| 2015/0091864 A1* | 4/2015 | Reynolds | G06F 3/044 |
| | | | 345/174 |
| 2015/0185956 A1 | 7/2015 | Takayama et al. | |
| 2016/0117030 A1* | 4/2016 | Kuo | G06F 3/0416 |
| | | | 345/173 |

FOREIGN PATENT DOCUMENTS

| KR | 10-2014-0075055 | 6/2014 |
|---|---|---|
| KR | 10-2015-0002202 | 1/2015 |
| KR | 10-1490705 | 2/2015 |
| KR | 10-2015-0038240 | 4/2015 |

\* cited by examiner

TOUCH SENSOR, DISPLAY APPARATUS INCLUDING TOUCH SENSOR, AND METHOD OF DRIVING DISPLAY APPARATUS INCLUDING TOUCH SENSOR

CROSS-REFERENCE TO RELATED APPLICATION

This application claims priority from and the benefit of Korean Patent Application No. 10-2015-0147297, filed on Oct. 22, 2015, which is hereby incorporated by reference for all purposes as if fully set forth herein.

BACKGROUND

Field

Exemplary embodiments relate to a touch sensor, a display apparatus including the touch sensor, and a method of driving the display apparatus including the touch sensor.

Discussion of the Background

A touch sensor may be utilized as an input device configured to recognize a position of a touch (or hovering interaction) when an appendage (e.g., finger, hand, etc.) of a person or an object is in contact with (or hovering closely over) the touch sensor. With the development of "smart" devices, e.g., smart appliances, smart phones, etc., has come an increase in the range of uses and requirements for touch sensors. For instance, a display panel configured to provide a display function and a touch position recognizing function is of interest, the display panel including a touch sensor disposed adjacent to the display panel, as is the addition of a touch function to a display panel. Conventionally, the touch position recognition function has been disturbed by the display function.

The above information disclosed in this Background section is only for enhancement of understanding of the background of the inventive concept, and, therefore, it may contain information that does not form the prior art that is already known to a person of ordinary skill in the art.

SUMMARY

Exemplary embodiments provide a touch sensor in which a touch position recognition function is not disturbed by a display function.

Exemplary embodiments provide a display apparatus including the touch sensor.

Exemplary embodiments provide a method of driving the display apparatus including the touch sensor.

Additional aspects will be set forth in the detailed description which follows, and, in part, will be apparent from the disclosure, or may be learned by practice of the inventive concept.

According to one or more exemplary embodiments, a touch sensor includes sensing electrodes and a touch controller. The sensing electrodes are electrically separated from each other, the sensing electrodes including a first sensing electrode and a second sensing electrode. The touch controller is configured to provide driving signals to the sensing electrodes, to receive sensing signals from the sensing electrodes, and to determine a touch position based on the sensing signals. The touch controller is further configured to, in response to reception of a frequency increase signal including information about the first sensing electrode, set a frequency of a driving signal provided to the first sensing electrode as a first frequency, and to set a frequency of a driving signal provided to the second sensing electrode as a second frequency different than the first frequency.

According to one or more exemplary embodiments, a display apparatus includes a display panel, a display panel driver, sensing electrodes, and a touch controller. The display panel includes pixels. The display panel driver includes a timing controller configured to receive image signals and timing signals, the display panel driver being configured to drive the pixels. The sensing electrodes are electrically separated from each other and include a first sensing electrode and a second sensing electrode. The touch controller is configured to provide driving signals to the sensing electrodes, to receive sensing signals from the sensing electrodes, and to determine a position of a touch based on the sensing signals. The timing controller is further configured to provide, in response to a condition of the first sensing electrode being a predetermined condition, a frequency increase signal including information about the first sensing electrode to the touch controller.

According to one or more exemplary embodiments, a method of driving a display apparatus, the method including: determining that a first sensing electrode associated with a display apparatus satisfies a predetermined condition; and generating, in response to the determination, a frequency increase signal including information about the first sensing electrode. The frequency increase signal is configured to affect a driving frequency of the first sensing electrode.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the Di1-axis, the Di2-axis, and a Di3-axis extending out of the page are not limited to three axes of a rectangular coordinate system, and may be interpreted in a broader sense. For example, the Di1-axis, the Di2-axis, and the Di3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
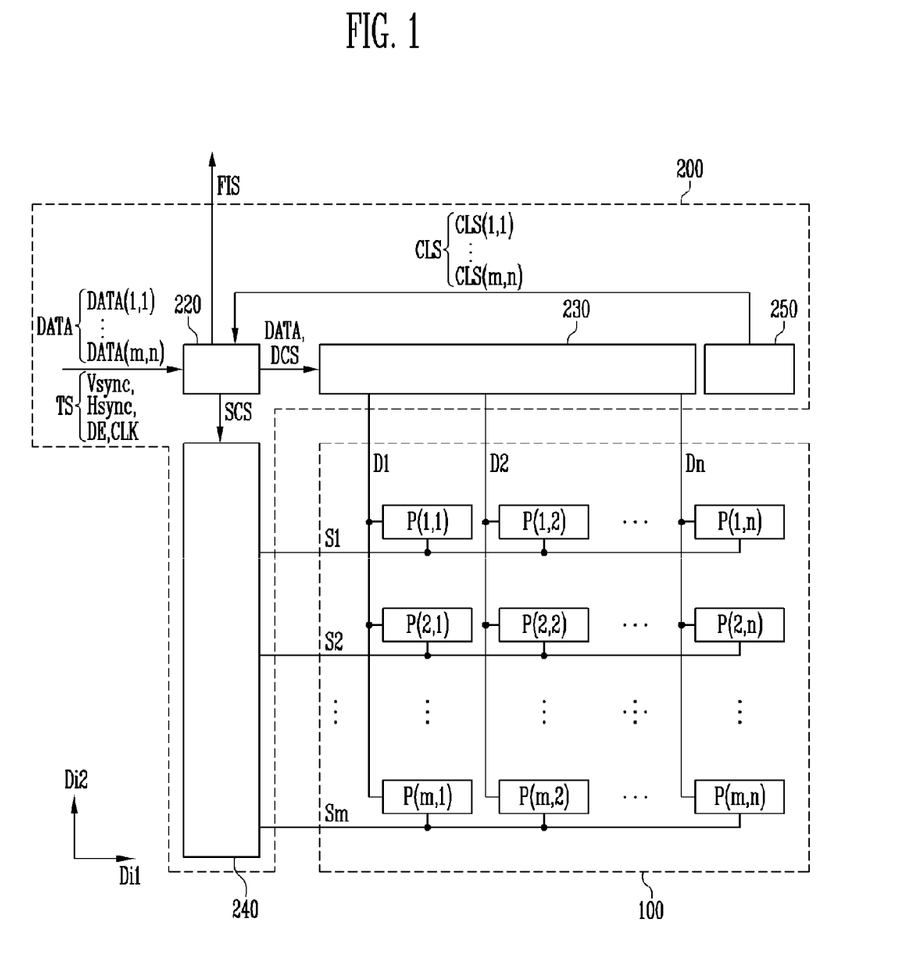
FIGS. 1, 2 and 3 are conceptual block diagrams of portions of a display apparatus, according to one or more exemplary embodiments.
Figure 2:
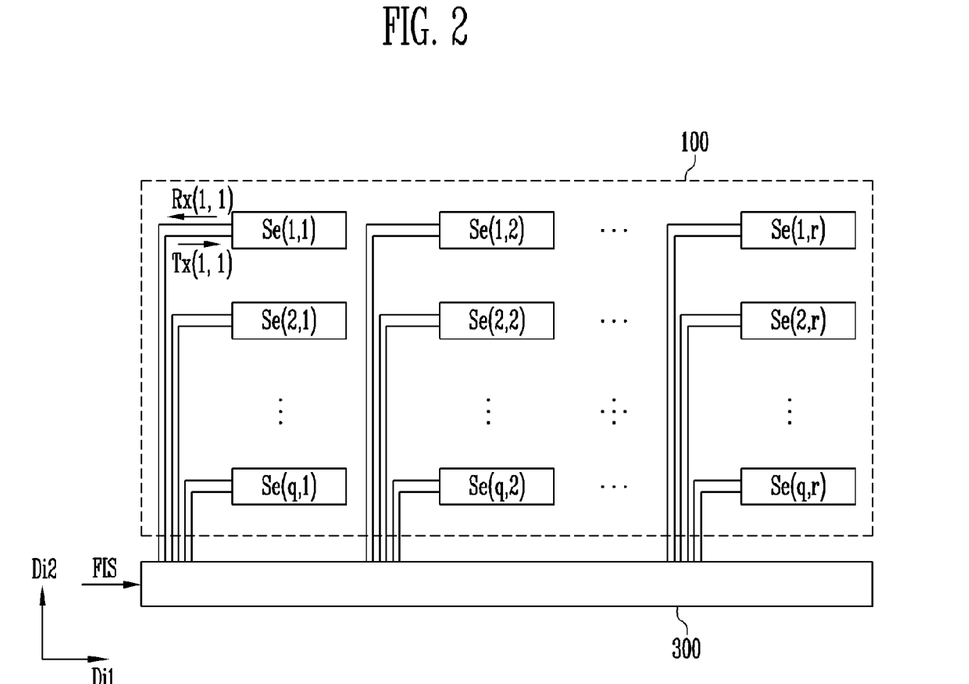
Figure 3:
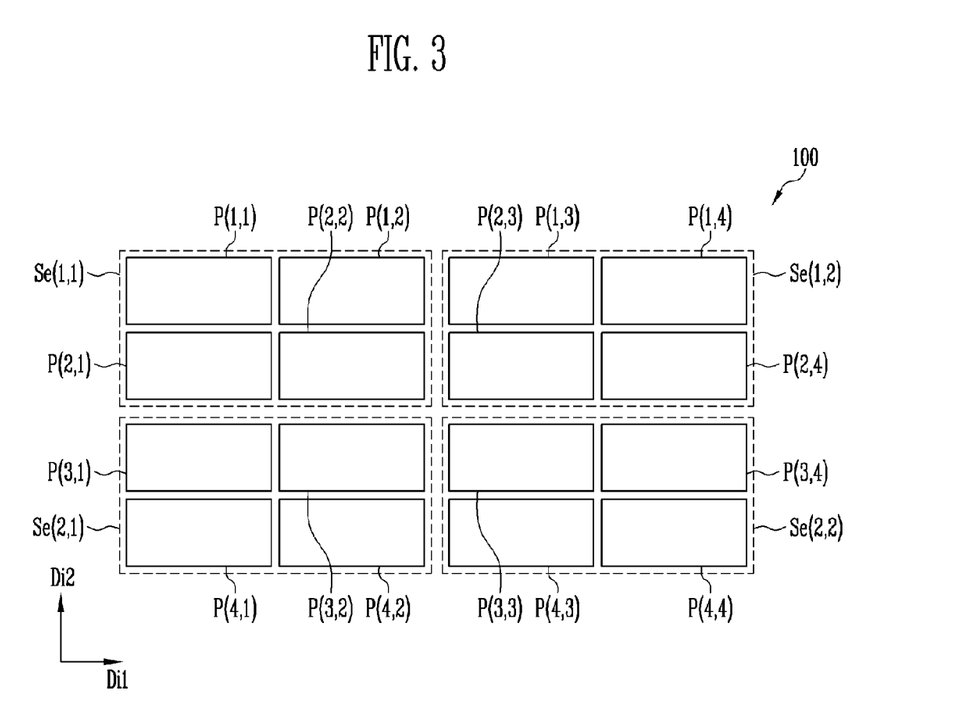

FIGS. 1, 2 and 3 are conceptual block diagrams of a display apparatus, according to one or more exemplary embodiments. More specifically, FIG. 1 is a conceptual block diagram of a portion of a display apparatus configured to provide a display function, FIG. 2 is a conceptual diagram of a portion of the display apparatus configured to provide a touch recognition function, and FIG. 3 is a conceptual block diagram of a display panel of the display apparatus. The phrases "display apparatus" and "display device" will be used interchangeably.

According to one or more exemplary embodiments, a display device may include a display panel 100, a display panel driving part 200, and a touch controller 300. Although specific reference will be made to this particular implementation, it is also contemplated that the display device may embody many forms and include multiple and/or alternative components.

Referring to FIG. 1, the display panel 100 includes pixels P(1,1) to P(m,n) ("m" and "n" being natural numbers greater than or equal to four (4), hereinafter, referred to as pixels P), data lines D1 to Dn (hereinafter, referred to as data lines D) transmitting data voltages to the pixels P and extended in a second direction Di2, and scan lines Si to Sm (hereinafter, referred to as scan lines S) transmitting scan signals to the pixels P and extended in a first direction Di1 crossing the second direction Di2. The n pixels of the pixels P are arranged in the first direction Di1 and the m pixels of the pixels P are arranged in the second direction Di2. A portion configured to provide a touch recognition function in association with the display device is omitted in FIG. 1 for illustrative and descriptive convenience.

The display panel driving part 200 includes a timing controller 220, a data driving part (or data driver) 230, a scan driving part (or scan driver) 240, and a current measuring part (or current measurer) 250.

The timing controller 220 receives image signals DATA and timing signals TS from, for instance, a source "outside" or otherwise external to the timing controller 220, and receives current level signals CLS from the current measuring part 250.

The image signals DATA correspond to the pixels P, respectively, and may include an image signal DATA(1,1) corresponding to the pixel P(1,1) to an image signal DATA(m,n) corresponding to the pixel P(m,n). Image signal DATA(a,b) ("a" being a natural number less than or equal to "m," and "b" being a natural number less than or equal to "n") corresponds to the pixel P(a,b), and includes a gray corresponding to the pixel P(a,b). The gray may have one value among integers from, for example, 0 to 255, 0 may be referred to as a black gray, and 255 may be referred to as a white gray. As the value of gray increases, luminance emitted by the pixel P(a,b) increases.

The timing signals TS include, for example, a vertical synchronization signal Vsync, a horizontal synchronization signal Hsync, a data enable signal DE, a dot clock signal CLK, and the like. The current level signals CLS correspond to the pixels P, respectively, and may include a current level signal CLS(1,1) corresponding to the pixel P(1,1) to a current level signal CLS(m,n) corresponding to the pixel P(m,n).

The timing controller 220 may determine whether a predetermined condition is satisfied based on the image signals DATA or the current level signals CLS. When the predetermined condition is satisfied, the timing controller 220 may output a frequency increase signal FIS. Frequency increase signal FIS will be described below in detail with reference to FIGS. 4 and 5. The timing controller 220 transmits the received image signals DATA to the data driving part 230, generates a data timing control signal DCS based on the timing signals TS, transmits the generated data timing control signal DCS to the data driving part 230, generates a scan timing control signal SCS based on the timing signals TS, and transmits the generated scan timing control signal SCS to the scan driving part 240.

The data driving part 230 latches the image signals DATA input from the timing controller 220 in response to the data timing control signal DCS. Although not illustrated, the data driving part 230 may include a plurality of source drive ICs, and the source drive ICs may be electrically connected to the data lines D of the display panel 100 by a chip-on-glass (COG) configuration or a tape automated bonding (TAB) configuration. The data driving part 230 may generate data voltages based on the image signals DATA and provide the data lines D with the data voltages. For instance, the data driving part 230 may provide the data lines D with the data voltages according to the data timing control signal DCS.

The scan driving part 240 sequentially or non-sequentially provides the scan signals to the scan lines S in response to the scan timing control signal SCS. The scan driving part 240 may be directly formed on a substrate of the display panel 100 by a gate-in-panel (GIP) configuration, or may be electrically connected to the scan lines S of the display panel 100 by a TAB configuration.

The current measuring part 250 generates the current level signals CLS by measuring a current level flowing in each pixel P, and transmits the generated current level signals CLS to the timing controller 220. When each pixel P includes an organic light emitting diode, luminance emitted by each pixel P and deterioration of the organic light emitting diode included in each pixel P may be measured by the current measuring part 250.

Referring to FIG. 2, the display panel 100 may additionally include sensing electrodes Se(1,1) to Se(q,r) ("q" and "r" being natural numbers greater than or equal to 2, hereinafter, referred to as sensing electrodes Se). A part related to a display function in the display device is omitted in FIG. 2 for illustrative and descriptive convenience. The sensing electrodes Se are electrically separated from each other. The sensing electrodes Se may be formed on a side of or inside the display panel 100, so that a touch (or hovering interaction) may be sensed in association with the display panel 100. The r sensing electrodes of the sensing electrodes Se are arranged in the second direction Di2 and the q sensing electrodes of the sensing electrodes Se are arranged in the first direction Di1.

The touch controller 300 provides driving signals to the sensing electrodes Se, receives sensing signals from the sensing electrodes, respectively, and calculates a touch position based on the sensing signals. For descriptive convenience, exemplary embodiments will, hereinafter, be described in association with sensing electrode Se(1,1), but similarly apply with respect to the other sensing electrodes Se. The touch controller 300 provides a driving signal Tx(1,1) to the sensing electrode Se(1,1) through a first signal line, and receives a sensing signal Rx(1,1) from the sensing electrode Se(1,1) through a second signal line. When a conductive object (for example, a part of a body, such as a finger) approaches the vicinity of the sensing electrode Se(1,1), a voltage or a current of the sensing signal Rx(1,1) changes as capacitance of sensing electrode Se(1,1) changes. The display device may recognize whether a touch operation of a user is generated at the vicinity of the sensing electrode Se(1,1) based on the voltage or the current of the sensing signal Rx(1,1). That is, the sensing electrodes Se and the touch controller 300 may operate as the touch sensor.

The sensing electrodes Se are electrically separated from each other, and a frequency of the driving signal provided to each sensing electrode Se may be set differently. As the number of driving signals in a time period increases as compared to the number of driving signals during the same time period, an influence associated with momentary noise may be reduced.

Referring to FIG. 3, the display panel 100 may include the sensing electrodes Se and the pixels P. Each sensing electrode Se may correspond to two or more pixels of the pixels P. In FIG. 3, the data lines D and the scan lines S in the display panel 100 and the signal lines between the sensing electrodes Se and the touch controller 300 are omitted for illustrative and descriptive convenience. Further, for descriptive convenience, only the pixels P(1,1) to P(4,4) among the pixels P are illustrated, and only the sensing electrodes Se(1,1) to Se(2,2) among the sensing electrodes Se are illustrated. The sensing electrode Se(1,1) may correspond to the pixels P(1,1), P(1,2), P(2,1), and P(2,2). The sensing electrode Se(1,2) may correspond to the pixels P(1,3), P(1,4), P(2,3), and P(2,4). The sensing electrode Se(2,1) may correspond to the pixels P(3,1), P(3,2), P(4,1), and P(4,2). The sensing electrode Se(2,2) may correspond to the pixels P(3,3), P(3,4), P(4,3), and P(4,4). However, such a correspondence is simply exemplary, and exemplary embodiments are not limited thereto.

Figure 4:
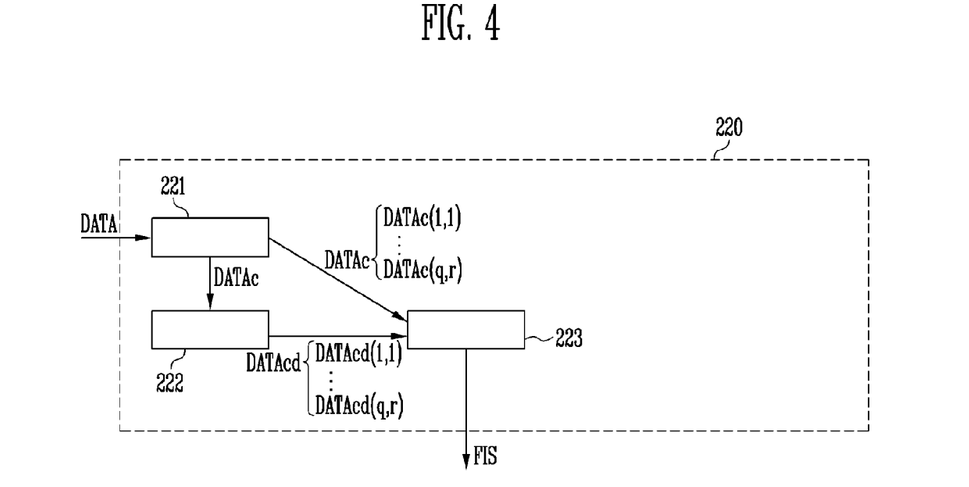
FIG. 4 is a conceptual block diagram of a timing controller of the display apparatus of FIG. 1, according to one or more exemplary embodiments.

FIG. 4 is a conceptual block diagram of a timing controller of the display apparatus of FIG. 1, according to one or more exemplary embodiments. A process of generating the frequency increase signal FIS by the timing controller 220 will be described with reference to FIGS. 1, 2, 3, and 4. In FIG. 4, the timing signals TS, the data timing control signal DCS, the scan timing control signal SCS, and the current level signals CLS, which are not related to generating the frequency increase signal FIS, are omitted for illustrative and descriptive convenience. Further, the provision of the image signals DATA to the data driving part 230 by the timing controller 220 is also omitted for illustrative and descriptive convenience.

The timing controller 220 includes an image signal converting part 221, a converted image signal storing part 222, and an image signal comparing part 223.

The image signal converting part 221 receives the image signals DATA from, for instance, an outside source, and converts the image signals DATA to correspond to the sensing electrodes Se, respectively. As such, converted image signals DATAc are generated, and are provided to the converted image signal storing part (e.g., a memory, buffer, etc.) 222 and the image signal comparing part 223. The converted image signals DATAc may include a converted image signal DATAc(1,1) corresponding to the sensing electrode Se(1,1) to a converted image signal DATAc(q,r) corresponding to the sensing electrode Se(q,r).

For descriptive convenience, the generation of the converted image signal DATAc(1,1) based on the image signals DATA(1,1) to DATA(2,2) for a first frame will be described as representative of the generation of other converted image signals DATAc. It may be assumed that the image signal DATA(1,1) includes a 0 gray, the image signal DATA(1,2) includes a 100 gray, the image signal DATA(2,1) includes a 200 gray, and the image signal DATA(2,2) includes a 255 gray. The image signal converting part 221 may determine a value of the converted image signal DATAc(1,1) as an average value of 0, 100, 200, and 255. A weighted value may be used when the average is calculated. When the image signals DATA for a second frame, which may be displayed after the first frame, is input to the image signal converting part 221, the image signal converting part 221 may also generate the converted image signals DATAc in correspondence with the second frame.

The converted image signal storing part 222 receives the converted image signals DATAc from the image signal converting part 221, delays the received converted image signals DATAc for a predetermined time, and outputs converted and delayed image signals DATAcd, e.g., to the image signal comparing part 223. That is, when the image signals DATA for the first frame are input to the timing controller 220, converted image signals DATAc corresponding to the first frame are generated by the image signal converting part 221 and are transmitted to the converted image signal storing part 222. When the image signals for the second frame are input to the timing controller 220 after a predetermined time, the converted image signal storing part 222 outputs the converted image signals DATAc corresponding to the first frame as converted and delayed image signals DATAcd corresponding to the second frame. The second frame may be displayed immediately after the first frame is displayed, but the second frame may be displayed after the first frame and i frames ("i" being a natural number) are displayed. Here, i may be less than or equal to than 10. The converted image signal storing part 222 may store converted image signals corresponding to frames displayed between the first frame and the second frame, as well as the first frame.

The image signal comparing part 223 compares the converted image signals DATAc and the converted and delayed image signals DATAcd for each frame and each sensing electrode Se, and determines whether the sensing electrode satisfies a predetermined condition. The converted image signals DATAc corresponding to the second frame and the converted and delayed image signals DATAcd corresponding to the second frame may be compared for each sensing electrode Se.

For descriptive convenience, an illustrative example will be described in association with the sensing electrode Se(t,u) ("t" being a natural number less than or equal to q, and "u" being a natural number less than or equal to "r"). When a difference between the converted image signal DATAc(t,u) and the converted and delayed image signal DATAcd(t,u) is greater than or equal to a predetermined value in the second frame, the image signal comparing part 223 may determine that the sensing electrode Se(t,u) satisfies the predetermined condition. In this manner, the image signal comparing part 223 transmits the frequency increase signal FIS containing information about the sensing electrode Se(t,u) to the touch controller 300. When none of the sensing electrodes Se satisfy the predetermined condition, the frequency increase signal FIS may not be transmitted to the touch controller 300.

Figure 5:
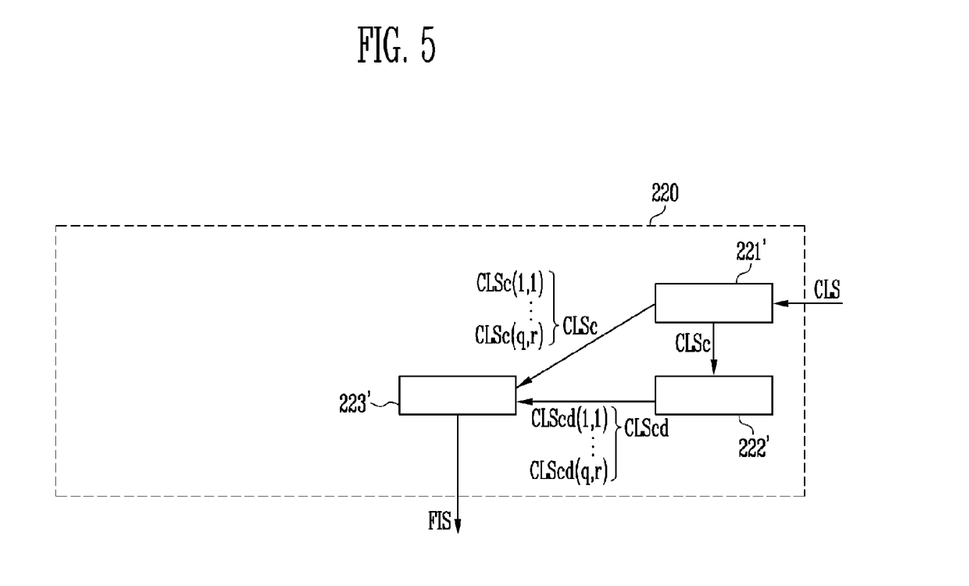
FIG. 5 is a conceptual block diagram of a timing controller of the display apparatus of FIG. 1, according to one or more exemplary embodiments.

FIG. 5 is a conceptual block diagram of a timing controller of the display apparatus of FIG. 1, according to one or more exemplary embodiments. A process of generating the frequency increase signal FIS by the timing controller 220 will be described with reference to FIGS. 1, 2, 3, 4, and 5. In FIG. 5, the image signals DATA, the timing signals TS, the data timing control signal DCS, and the scan timing control signal SCS, which are not related to generating the frequency increase signal FIS, are omitted for illustrative and descriptive convenience.

The timing controller 220 includes a current level signal converting part 221', a converted current level signal storing part 222', and a current level signal comparing part 223'.

The current level signal converting part 221' receives the current level signals CLS from the current measuring part 250, and converts the current level signals corresponding to a first frame so as to correspond to the sensing electrodes Se, respectively. As such, converted current level signals CLSc are generated, and are transmitted to the converted current level signal storing part (e.g., a memory, buffer, etc.) 222' and the current level signal comparing part 223'. The converted current level signals CLSc may include a converted current level signal CLSc(1,1) corresponding to the sensing electrode Se(1,1) to a converted current level signal CLSc(q,r) corresponding to the sensing electrode Se(q,r).

For descriptive convenience, the generation of the converted current level signal CLSc(1,1) based on the current level signals CLS(1,1) to CLS(2,2) for the first frame will be described as representative of the generation of other converted current level signals CLSc. It may be assumed that the current level signal CLS(1,1) includes a 5 value, the current level signal CLS(1,2) includes a 70 value, the current level signal CLS(2,1) includes a 150 value, and the current level signal CLS(2,2) includes a 300 value. The current level signal converting part 221' may determine a value of the converted current level signal CLSc(1,1) as an average value of 5, 70, 150, and 300. A weighted value may be used when the average is calculated. When the current level signals CLS for a second frame, which may be displayed after the first frame, is input into the current level signal converting part 221', the current level signal converting part 221' may also generate converted current level signals CLSc.

The converted current level signal storing part 222' receives the converted current level signals CLSc from the current level signal converting part 221', delays the received converted current level signals CLSc for a predetermined time, and outputs converted and delayed current level signals CLScd, e.g., to the current level signal comparing part 223'. That is, when the current level signals for the first frame are input into the timing controller 220, converted current level signals CLSc corresponding to the first frame are generated by the current level signal converting part 221' and are transmitted to the converted current level signal storing part 222'. When the image signals for the second frame are input into the timing controller 220 after a predetermined time, the converted current level signal storing part 222' outputs the converted current level signals CLSc corresponding to the first frame as converted and delayed current level signals CLScd corresponding to the second frame. The second frame may be displayed immediately after the first frame is displayed, but the second frame may be displayed after the first frame and i frames ("i" being a natural number) are displayed. Here, i may be less than or equal to 10. The converted current level signal storing part 222' may store converted current level signals corresponding to frames displayed between the first frame and the second frame, as well as the first frame.

The current level signal comparing part 223' compares the converted current level signals CLSc and the converted and delayed current level signals CLScd for each frame and each sensing electrode Se, and determines whether the sensing electrode satisfies a predetermined condition. The converted current level signals CLSc corresponding to the second frame and the converted and delayed current level signals CLScd corresponding to the second frame may be compared for each sensing electrode Se.

For descriptive convenience, an illustrative example will be described in association with the sensing electrode Se(t,u) ("t" being a natural number less than or equal to "q," and "u" being a natural number less than or equal to "r"). When a difference between the converted current level signal CLSc (t,u) and the converted and delayed current level signal CLScd(t,u) is greater than or equal to a predetermined value, the current level signal comparing part 223' may determine that the sensing electrode Se(t,u) satisfies the predetermined condition. In this manner, the current level signal comparing part 223' transmits the frequency increase signal FIS containing information about the sensing electrode Se(t,u) to the touch controller 300. When none of the sensing electrodes Se satisfy the predetermined condition, the frequency increase signal FIS may not be transmitted to the touch controller 300.

As described in association with FIGS. 4 and 5, the image signal comparing part 223 compares only the converted image signals DATAc with the converted and delayed image signals DATAcd, and the current level signal comparing part 223' compares only the converted current level signals CLSc with the converted and delayed current level signals CLScd, but this is merely one exemplary embodiment and exemplary embodiments are not limited thereto. For example, a comparing part (not illustrated) may also determine whether each sensing electrode Se satisfies a predetermined condition by comparing the converted current level signals CLSc with the converted and delayed image signals DATAcd, as well as by comparing the converted image signals DATAc and the converted and delayed image signals DATAcd.

Figure 6A:
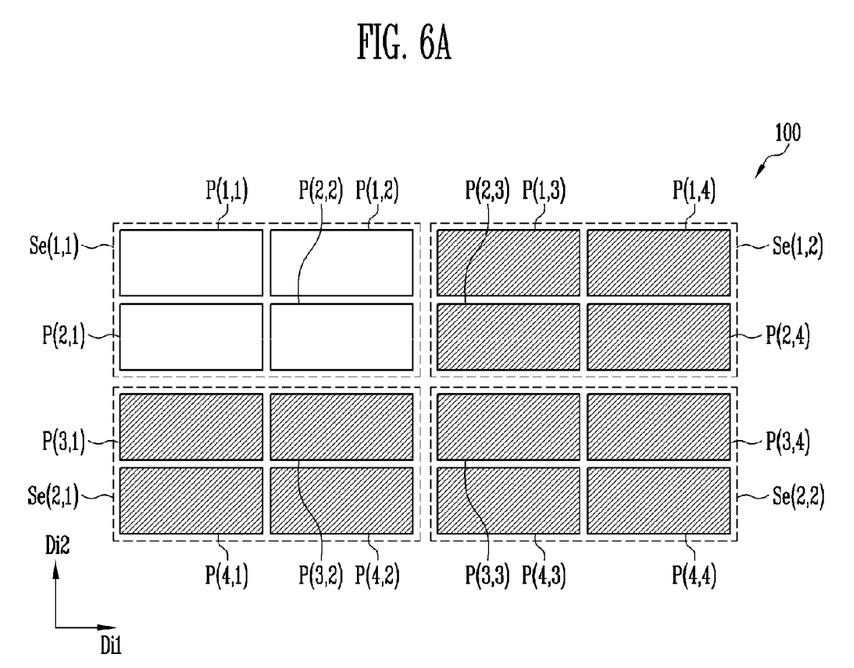
FIG. 6A is a conceptual block diagram of an image being displayed in a first frame using the display apparatus of FIG. 3, according to one or more exemplary embodiments.
Figure 6B:
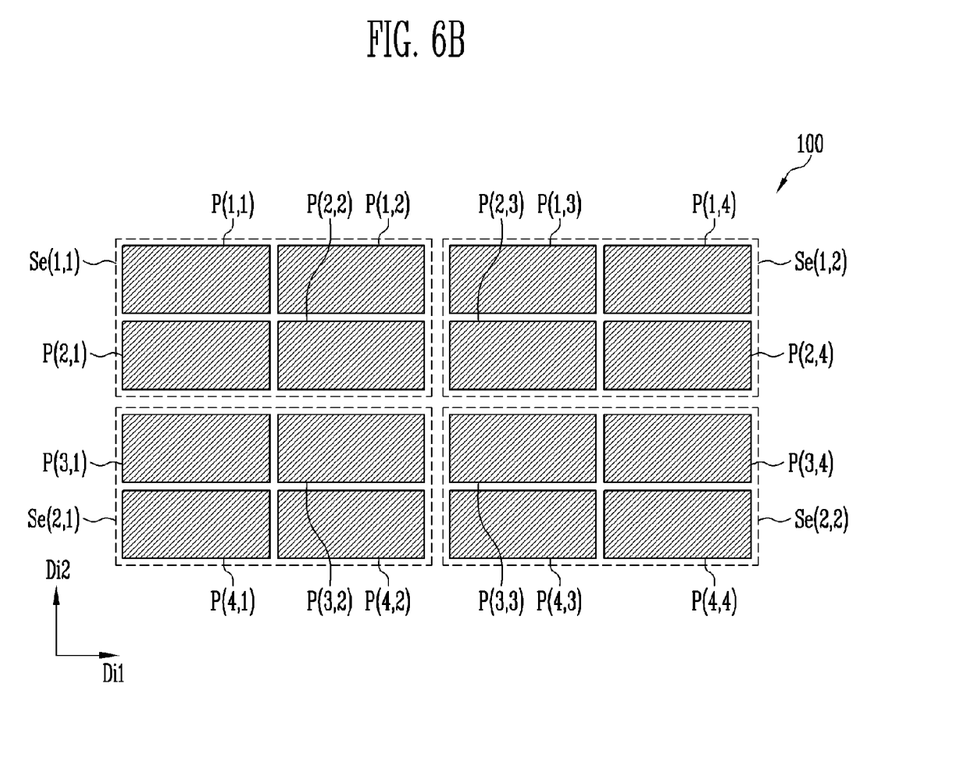
FIG. 6B is a conceptual block diagram of an image being displayed in a second frame using the display apparatus of FIG. 3, according to one or more exemplary embodiments.

FIG. 6A is a conceptual block diagram of an image being displayed in a first frame using the display apparatus of FIG. 3, according to one or more exemplary embodiments, whereas FIG. 6B is a conceptual block diagram of an image being displayed in a second frame using the display apparatus of FIG. 3, according to one or more exemplary embodiments. A process of determining whether sensing electrodes Se(1,1) to Se(2,2) satisfy a predetermined condition will be described with reference to FIGS. 1, 2, 3, 4, 5, 6A, and 6B.

Referring to FIG. 6A, pixels P(1,1), P(1,2), P(2,1), and P(2,2) emit light corresponding to the white gray, and remaining pixels P(1,3), P(1,4), P(2,3), P(2,4), P(3,1), P(3, 2), P(4,1), P(4,2), P(3,3), P(3,4), P(4,3), and P(4,4) do not emit light in response to the black gray. Referring to FIG. 6B, pixels P(1,1) to P(4,4) do not emit light in response to the black gray, nor do pixels P(1,3) to P(4,4).

That is, the pixels P(1,1), P(1,2), P(2,1), and P(2,2) emit light and the remaining pixels P(1,3), P(1,4), P(2,3), P(2,4), P(3,1), P(3,2), P(4,1), P(4,2), P(3,3), P(3,4), P(4,3), and P(4,4) do not emit light in the first frame, and then the pixels P(1,1) to P(4,4) do not emit light in the second frame, which is displayed after the first frame. In this manner, it may be determined that a sensing electrode Se(1,1) corresponding to the pixels P(1,1), P(1,2), P(2,1), and P(2,2) satisfies the predetermined condition, and remaining sensing electrodes Se(1,2), Se(2,1), and Se(2,2) corresponding to the remaining pixels P(1,3), P(1,4), P(2,3), P(2,4), P(3,1), P(3,2), P(4,1), P(4,2), P(3,3), P(3,4), P(4,3), and P(4,4) do not satisfy the predetermined condition. Accordingly, a frequency increase signal FIS containing the information about the sensing electrode Se(1,1) may be transmitted from the timing controller 220 to the touch controller 300. The touch controller 300 may set a frequency of the driving signal provided to the sensing electrode Se(1,1) as a first frequency (for example, 60 Hz), and may set a frequency of the driving signal provided to the remaining sensing electrodes Se(1,2), Se(2, 1), and Se(2,2) as a second frequency (for example, 30 Hz).

The frequency of the driving signal provided to each sensing electrode Se may be set differently. As the number of driving signals provided in a time period increases as compared to the number of driving signals during the same time period, an influence associated with momentary noise may be reduced, but power consumption may increase due to an increase in the number of driving signals being provided. The display device, according to one or more exemplary embodiments, provides a driving signal having a relatively high frequency only to the sensing electrode corresponding to the pixels having large change in a degree of light emission. As such, the display device may decrease unnecessary power consumption by providing the driving signal having a relatively lower frequency to the sensing electrodes corresponding to the pixels having small change in a degree of light emission, and may prevent the touch recognition function from being erroneously operated by noise due to change in a degree of light emission.

Figure 7:
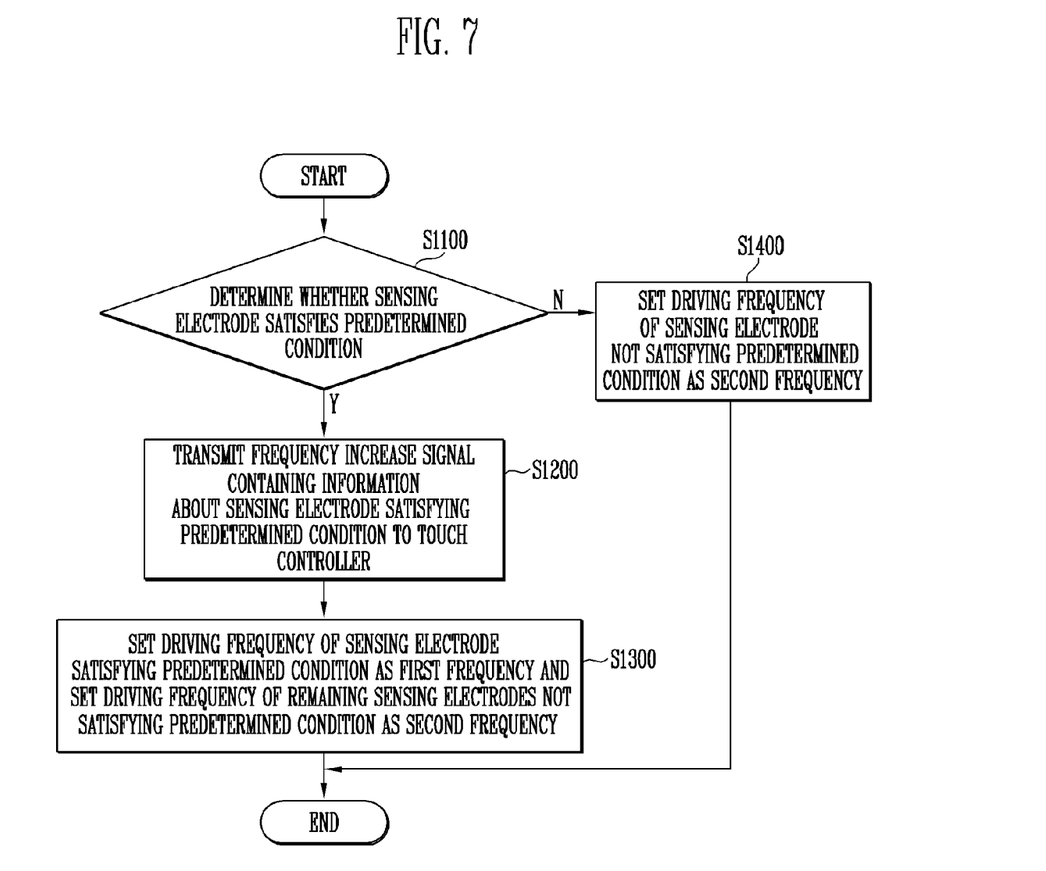
FIG. 7 is a flowchart of a process to drive a display apparatus, according to one or more exemplary embodiments.

FIG. 7 is a flowchart of a process to drive a display apparatus, according to one or more exemplary embodiments. A process of driving a display device will be described with reference to FIGS. 1, 2, 3, 4, 5, 6A, 6B, and 7.

In step S1100, it is determined whether a sensing electrode, e.g., the first sensing electrode Se(1,1), satisfies a predetermined condition. Step S1100 will be described in more detail with reference to FIGS. 8 and 9. When, for example, the sensing electrode satisfies the predetermined condition, step S1200 is performed, otherwise, step S1400 is performed.

When the sensing electrode satisfies the predetermined condition, a frequency increase signal FIS containing information about the sensing electrode is transmitted to the touch controller 300, in step S1200. Referring to FIGS. 6A and 6B, the first sensing electrode may be the sensing electrode Se(1,1) and satisfies the predetermined condition.

The frequency increase signal FIS may contain information about the first sensing electrode Se(1,1).

In step S1300, the touch controller 300 receives the frequency increase signal FIS containing information about the sensing electrode satisfying the predetermined condition. Referring to FIGS. 6A and 6B, the sensing electrode may be the first sensing electrode Se(1,1). Accordingly, the touch controller 300 may set a frequency of the driving signal provided to the first sensing electrode Se(1,1) as a first frequency (for example, 60 Hz), and may set a frequency of the driving signal provided to the remaining sensing electrodes Se(1,2), Se(2,1), and Se(2,2) not satisfying the predetermined condition as a second frequency (for example, 30 Hz).

In step S1400, the sensing electrode is determined to not satisfy the predetermined condition and the sensing electrode is sensed as the second frequency (for example, 30 Hz). That is, the touch controller 300 may set the frequency of the driving signal provided to the sensing electrode as the second frequency (for example, 30 Hz). This may apply to all or some of the sensing electrodes Se.

Figure 8:
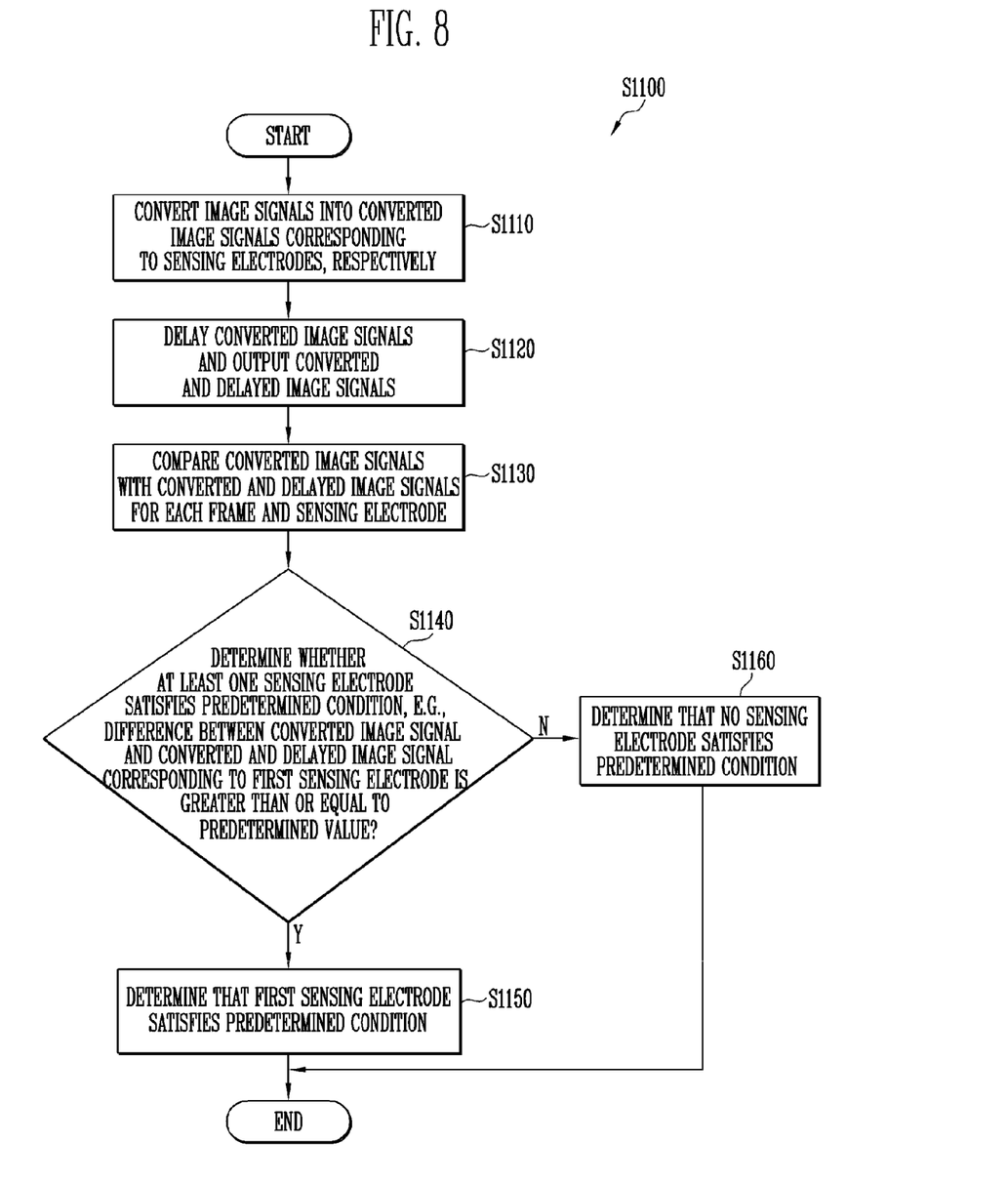
FIG. 8 is a flowchart of a process to determine whether a sensing electrode satisfies a predetermined condition, according to one or more exemplary embodiments.

FIG. 8 is a flowchart of a process to determine whether a sensing electrode satisfies a predetermined condition, according to one or more exemplary embodiments. Step S1100 of FIG. 7 will be described with reference to FIGS. 1, 2, 3, 5, 6A, 6B, 7, and 8.

In step S1110, the image signal converting part 221 converts image signals DATA into converted image signals DATAc. The converted image signals DATAc correspond to the sensing electrodes Se, respectively, and a converting process has been described with reference to FIG. 4. In step S1110, the converted image signals DATAc are transmitted to the converted image signal storing part 222 and the image signal comparing part 223.

In step S1120, the converted image signal storing part 222 delays the converted image signals DATAc and outputs converted and delayed image signals DATAcd. Outputting the converted image signals DATAc corresponding to the first frame as the converted and delayed image signals DATAcd corresponding to the second frame by the converted image signal storing part 222 has been described with reference to FIG. 4.

The image signal comparing part 223 compares the converted image signals DATAc with the converted and delayed image signals DATAcd for each frame and each sensing electrode Se, per step S1130. The comparison between the converted image signals DATAc corresponding to the second frame and the converted and delayed image signals DATAcd corresponding to the second frame for each sensing electrode Se has been described with reference to FIG. 4.

In step S1140, when there exists a first sensing electrode, in which a difference between the converted image signal and the converted and delayed image signal corresponding to the first sensing electrode is greater than or equal to a predetermined value, step S1150 is performed. Otherwise, step S1160 is performed. According to one or more exemplary embodiments, the first sensing electrode may be Se(t,u), the converted image signal may be DATAc(t,u), and the converted and delayed image signal may be DATAcd(t,u).

In step S1150, it is determined that the first sensing electrode satisfying the predetermined condition exists. Information about the first sensing electrode, in which the difference between the converted image signal and the converted and delayed image signal is greater than or equal to the predetermined value, may be stored. According to one or more exemplary embodiments, the first sensing electrode may be sensing electrode Se(t,u), the converted image signal may be DATAc(t,u), and the converted and delayed image signal may be DATAcd(t,u). In step S1160, it is determined that a sensing electrode satisfying the predetermined condition does not exist.

Figure 9:
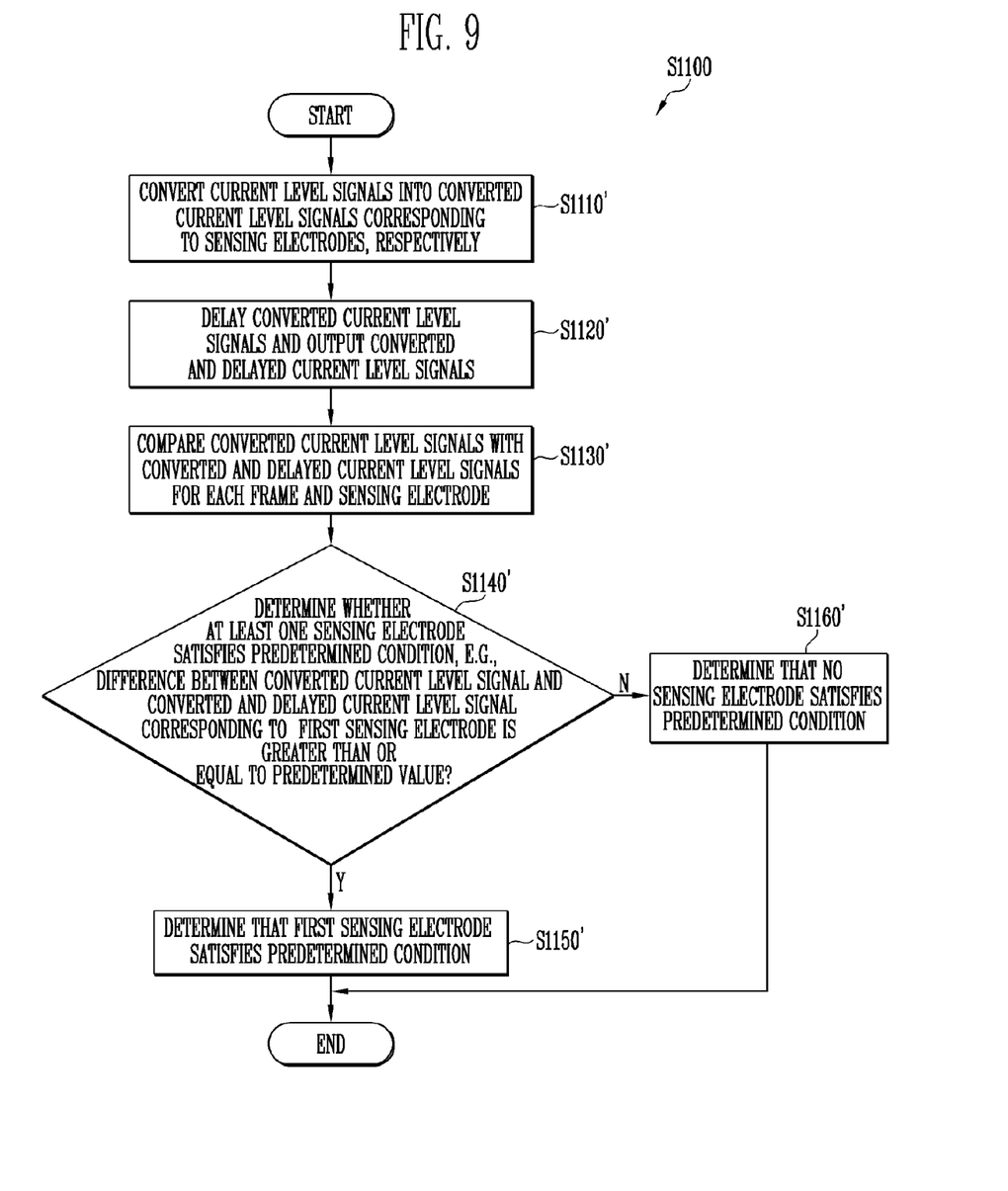
FIG. 9 is a flowchart of a process to determine whether a sensing electrode satisfies a predetermined condition, according to one or more exemplary embodiments.

FIG. 9 is a flowchart of a process to determine whether a sensing electrode satisfies a predetermined condition, according to one or more exemplary embodiments. Step S1100 of FIG. 7 will be described with reference to FIGS. 1, 2, 3, 5, 6A, 6B, 7, and 9.

In step 1110', the current level signal converting part 221' converts current level signals CLS into converted current level signals CLSc. The converted current level signals CLSc correspond to the sensing electrodes Se, respectively, and a converting process has been described with reference to FIG. 5. In step 1110', the converted current level signals CLSc are transmitted to the converted current level signal storing part 222' and the current level signal comparing part 223'.

In step 1120', the converted current level signal storing part 222' delays the converted current level signals CLSc and outputs converted and delayed current level signals CLScd. Outputting the converted current level signals CLSc corresponding to the first frame as the converted and delayed current level signals CLScd corresponding to the second frame by the converted current level signal storing part 222' has been described with reference to FIG. 5.

In step S1130', the current level signal comparing part 223' compares the converted current level signals CLSc with the converted and delayed current level signals CLScd for each frame and each sensing electrode Se. The comparison between the converted current level signals CLSc corresponding to the second frame and the converted and delayed current level signals CLScd corresponding to the second frame for each sensing electrode Se has been described with reference to FIG. 5.

In step S1140', when there exists a first sensing electrode, in which a difference between the converted current level signal and the converted and delayed current level signal corresponding to the first sensing electrode is equal to or larger than a predetermined value, step S1150' is performed. Otherwise, step S1160' is performed. According to one or more exemplary embodiments, the first sensing electrode may be Se(t,u), the converted current level signal may be CLSc(t,u), and the converted and delayed current level signal may be CLScd(t,u).

In step S1150', it is determined that the first sensing electrode satisfying the predetermined condition exists. Information about the first sensing electrode, in which the difference between the converted current level signal and the converted and delayed current level signal is greater than or equal to the predetermined value, may be stored. According to one or more exemplary embodiments, the first sensing electrode may be Se(t,u), the converted current level signal may be CLSc(t,u), and the converted and delayed current level signal may be CLScd(t,u). In step S1160', it is determined that a sensing electrode satisfying the predetermined condition does not exist.

According to one or more exemplary embodiments, a touch sensor, a display device including the touch sensor, and a method of driving a display device including the touch sensor in which a touch position recognition function is not disturbed by a display function may be provided.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch sensor, comprising:
sensing electrodes electrically separated from each other, the sensing electrodes comprising a first sensing electrode and a second sensing electrode; and
a touch controller configured to provide driving signals to the sensing electrodes, to receive sensing signals from the sensing electrodes, and to determine a touch position based on the sensing signals,
wherein the touch controller is further configured to, in response to reception of a frequency increase signal comprising information about the first sensing electrode, set a frequency of a driving signal provided to the first sensing electrode as a first frequency, and to set a frequency of a driving signal provided to the second sensing electrode as a second frequency different than the first frequency.

2. The touch sensor of claim 1, wherein:
the frequency increase signal is associated with a condition of the first sensing electrode satisfying a predetermined condition; and
the touch controller is further configured to, in response the condition of the first sensing electrode being other than the predetermined condition, set the frequency of the driving signal provided to the first sensing electrode and the driving signal provided to the second sensing electrode as the second frequency.

3. The touch sensor of claim 1, wherein the second frequency is lower than the first frequency.

4. A display apparatus, comprising:
a display panel comprising pixels;
a display panel driver comprising a timing controller configured to receive image signals and timing signals, the display panel driver being configured to drive the pixels;
sensing electrodes electrically separated from each other, the sensing electrodes comprising a first sensing electrode and a second sensing electrode; and
a touch controller configured to provide driving signals to the sensing electrodes, to receive sensing signals from the sensing electrodes, and to determine a position of a touch based on the sensing signals,
wherein the timing controller is further configured to provide, in response to a condition of the first sensing electrode being a predetermined condition, a frequency increase signal comprising information about the first sensing electrode to the touch controller.

5. The display apparatus of claim 4, wherein the touch controller is further configured to, in response to reception of the frequency increase signal, set a frequency of a driving signal provided to the first sensing electrode as a first frequency, and to set a frequency of a driving signal provided to the second sensing electrode as a second frequency different than the first frequency.

6. The display apparatus of claim 5, wherein the second frequency is lower than the first frequency.

7. The display apparatus of claim 5, wherein the touch controller is further configured to, in response to the condition of the first sensing electrode being other than the predetermined condition, set the frequency of the driving signal supplied to the first sensing electrode and the driving signal provided to the second sensing electrode as the second frequency.

8. The display apparatus of claim 4, wherein the timing controller is further configured to:
convert the image signals to respectively correspond to the sensing electrodes;
store the converted image signals;
delay the converted image signals for a predetermined time; and
determine whether the sensing electrodes satisfy the predetermined condition based on comparisons of the converted image signals with the converted and delayed image signals for each sensing electrode of the sensing electrodes in association with a plurality of frames.

9. The display apparatus of claim 8, wherein the predetermined condition comprises a difference between a converted image signal and a converted and delayed image signal associated with a sensing electrode of the sensing electrodes being greater than or equal to a predetermined value.

10. The display apparatus of claim 4, wherein each pixel of the pixels is associated with a current level signal corresponding to a level of current flow therein.

11. The display apparatus of claim 10, wherein the timing controller is further configured to:
convert the current level signals to respectively correspond to the sensing electrodes;
store the converted current level signals;
delay the converted current level signals for a predetermined time; and
determine whether the sensing electrodes satisfy the predetermined condition based on comparisons of the converted current level signals with the converted and delayed current level signals for each sensing electrode of the sensing electrodes in association with a plurality of frames.

12. The display apparatus of claim 11, wherein the predetermined condition comprises a difference between a converted current level signal and a converted and delayed current level signal associated with a sensing electrode of the sensing electrodes being greater than or equal to a predetermined value.

13. The display apparatus of claim 4, wherein the sensing electrodes are formed on an outer surface of the display panel.

14. The display apparatus of claim 4, wherein the sensing electrodes are embedded in the display panel.

15. A method comprising:
determining that a first sensing electrode associated with a display apparatus satisfies a predetermined condition;
generating, in response to the determination, a frequency increase signal comprising information about the first sensing electrode, the frequency increase signal being configured to affect a driving frequency of the first sensing electrode.

16. The method of claim 15, further comprising:
setting, according to the frequency increase signal, a driving frequency of the first sensing electrode as a first frequency;
setting a driving frequency of a second sensing electrode as a second frequency lower than the first frequency, the second sensing electrode satisfying a condition other than the predetermined condition.

17. The method of claim 15, further comprising:
receiving image signals corresponding to image frames, wherein determining that the first sensing electrode satisfies the predetermined condition comprises:

converting the image signals into converted image signals corresponding to the first sensing electrode;

storing the converted image signals;

delaying the converted image signals for a predetermined time; and comparing the converted image signals with the converted and delayed image signals for each image frame of the image frames.

18. The method of claim 17, wherein the predetermined condition comprises a difference between a converted image signal and a converted and delayed image signal being greater than or equal to a predetermined value.

19. The method of claim 15, wherein:

the display apparatus comprises pixels configured to display images during image frames, each pixel of the pixels being associated with a current level signal corresponding to a level of current flow therein; and determining that the first sensing electrode satisfies the predetermined condition comprises:

converting the current level signals into converted current level signals corresponding to the first sensing electrode;

storing the converted current level signals;

delaying the converted current level signals for a predetermined time; and comparing the converted current level signals with the converted and delayed current level signals for each image frame of the image frames.

20. The method of claim 19, wherein the predetermined condition comprises a difference between a converted current level signal and a converted and delayed current level signal being greater than or equal to a predetermined value.

* * * * *